(12) United States Patent
Wilcher (10) Patent No.: US 6,994,785 B2
(45) Date of Patent: Feb. 7, 2006

(54) REMOVABLE GRID FOR FILTER ELEMENT SCREENS

(75) Inventor: Stephen B. Wilcher, Harleysville, PA (US)

(73) Assignee: United States Filter Corporation, Palm Desert, CA (US)

( * ) Notice: Subject to any disclaimer, the term of this patent is extended or adjusted under 35 U.S.C. 154(b) by 34 days.

(21) Appl. No.: 10/364,871

(22) Filed: Feb. 10, 2003

(65) Prior Publication Data

US 2003/0159982 A1    Aug. 28, 2003

Related U.S. Application Data

(60) Provisional application No. 60/355,016, filed on Feb. 8, 2002.

(51) Int. Cl.
E02B 5/04       (2006.01)
B01D 33/04      (2006.01)

(52) U.S. Cl. ............... 210/160; 210/232; 210/400
(58) Field of Classification Search ........... 210/160, 210/400, 401, 159, 232
See application file for complete search history.

(56) References Cited

U.S. PATENT DOCUMENTS

| | | | |
|---|---|---|---|
| 1,967,050 A * | 7/1934 | Brackett ............... 210/160 |
| 2,286,332 A | 6/1942 | Bleyer | |
| 2,428,757 A * | 10/1947 | Lind ............... 198/834 |
| 3,608,727 A * | 9/1971 | Grutsch et al. ........ 210/242.4 |
| 3,757,949 A | 9/1973 | Halvorsen et al. | |
| 3,802,565 A | 4/1974 | Hughes et al. | |
| 4,359,385 A | 11/1982 | Krivec | |
| 4,360,426 A | 11/1982 | Wetzel | |
| 4,582,601 A * | 4/1986 | Strow et al. ........... 210/161 |
| 4,597,864 A | 7/1986 | Wiesemann | |
| 4,774,010 A | 9/1988 | Bratten | |
| 5,242,583 A * | 9/1993 | Thomas ............... 210/161 |
| 5,415,766 A | 5/1995 | Quick et al. | |
| 5,618,415 A | 4/1997 | Johnson, Jr. | |
| 5,788,839 A * | 8/1998 | Gargan, et al. ........ 210/160 |
| 5,798,039 A | 8/1998 | Wiesemann | |
| 5,800,701 A | 9/1998 | Larsen | |
| 5,993,651 A | 11/1999 | Wiesemann | |
| 6,019,892 A | 2/2000 | Wilcher | |
| 6,251,268 B1 | 6/2001 | Holmberg | |
| 6,267,880 B1 * | 7/2001 | Jackson ............... 210/160 |
| 6,280,612 B1 | 8/2001 | Kroos | |
| 6,294,085 B1 | 9/2001 | Bache | |

* cited by examiner

Primary Examiner—Thomas M. Lithgow (57) ABSTRACT

A fine filter screen assembly comprising a length of filter screen having a relatively fine filtering surface and terminating at opposite ends with opposed end shafts. Generally open connecting means interconnect the opposed end shafts to define a continuous loop structure. At least one removable filter grid having a substantially fine filtering surface is removably mounted between the opposed end shafts such that the continuous loop structure has a substantially continuous relatively fine filtering surface. Removal of the grid allows internal access to the screen assembly.

16 Claims, 11 Drawing Sheets

REMOVABLE GRID FOR FILTER ELEMENT SCREENS

This application claims the benefit of Provisional application No. 60/355,016, filed Feb. 8, 2002.

BACKGROUND

Difficulties are encountered in practice in the treatment of contaminated water flows such as sewage prior to fine filtration, due to the presence of heavy and generally untreatable objects such as rags, string, plastic bags, and the like. Wastewater treatment plants typically utilize some type of screening equipment to remove harmful debris contained in the waste stream flow. Screening equipment is often utilized in the headworks section of the plant, and is the first area to come in contact with the waste stream. The screens are typically made from corrosion resistant materials such as 304 or 316 stainless steel. In order to protect the downstream equipment and processes, screening equipment is designed and incorporated in a plant to remove a large majority of debris before it comes into contact with any downstream equipment. If such items are not removed, proper and adequate treatment of the liquid does not result, and blockage of ducts and channels may occur.

A screening device is known comprising a continuously movable endless conveyor loop formed of a series of interconnected link pieces each having a lifting hook on which material to be screened is collected during movement through the contaminated water flow. There are many different screening equipment designs. Fine screens are typically defined by the size of the screen openings, which can be from as small as a quarter inch to one-half inch. These units can also be sized to have clear openings as large as 2 inches or more, but typically are not. The screen openings are designed to address both the horizontal and vertical limiting dimensions. The horizontal dimension is the small dimension and definition of the continuous belt, for example, one-quarter inch. The vertical dimension is typically significantly larger (approx. 4 in. or 6 in.) and is tied to the length of individual elements and the interconnected driving links and support shafts or pivot rods.

Figure 1:
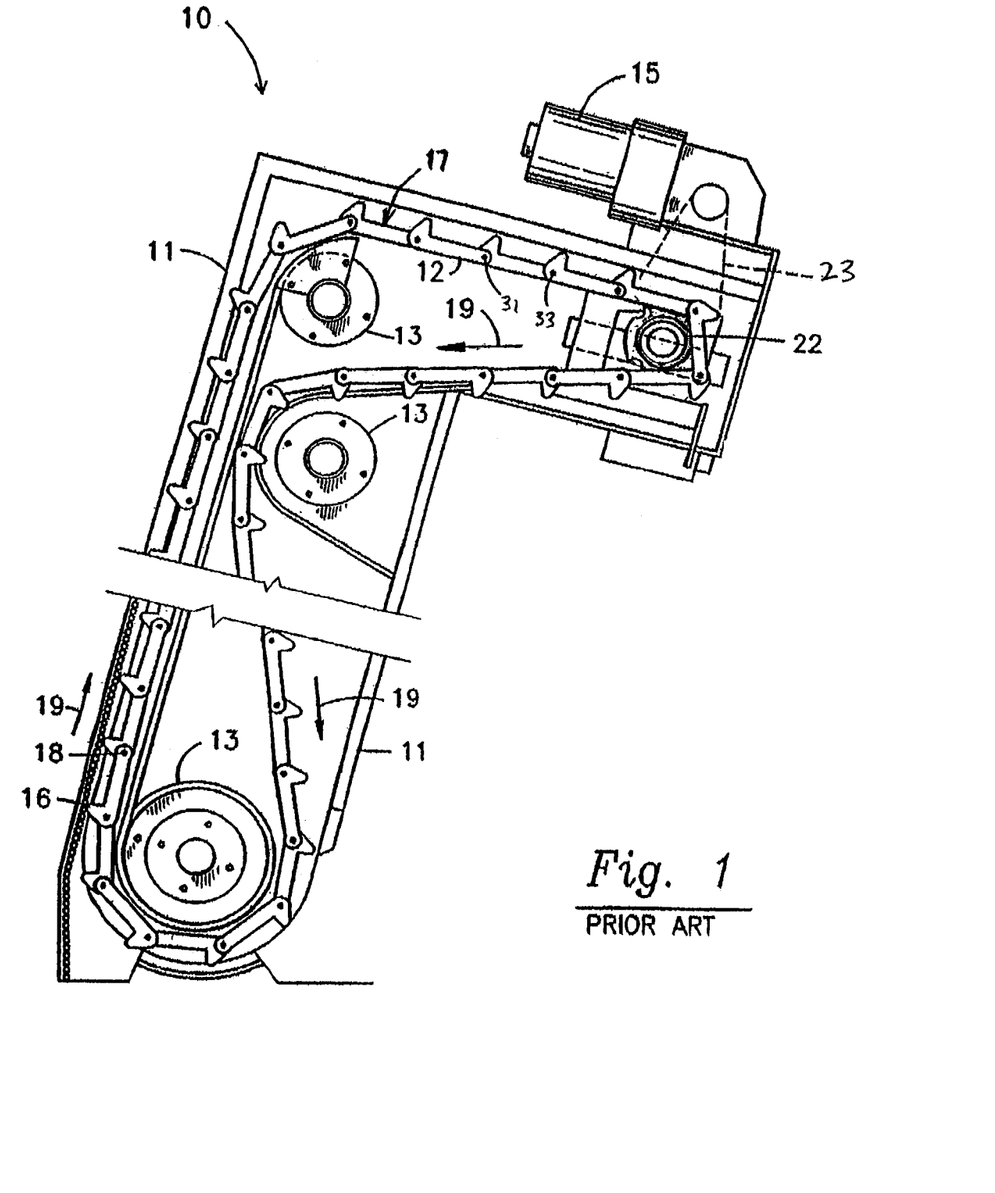
FIG. 1 is a side elevational view of a prior art waste material filter assembly.
Figure 2:
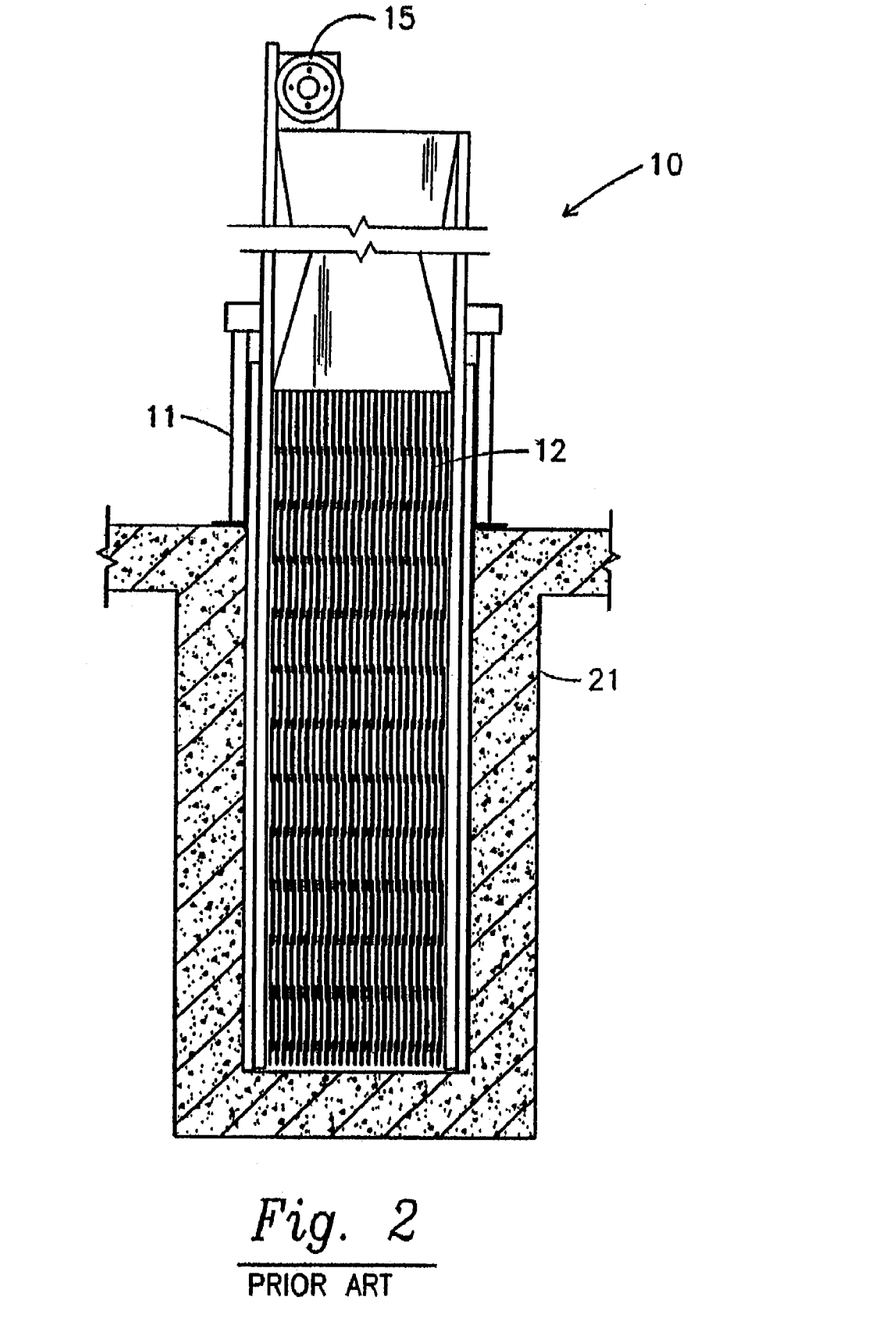
FIG. 2 is a front elevational view of the filter assembly of FIG. 1 disposed in a channel for carrying waste water.
Figure 3:
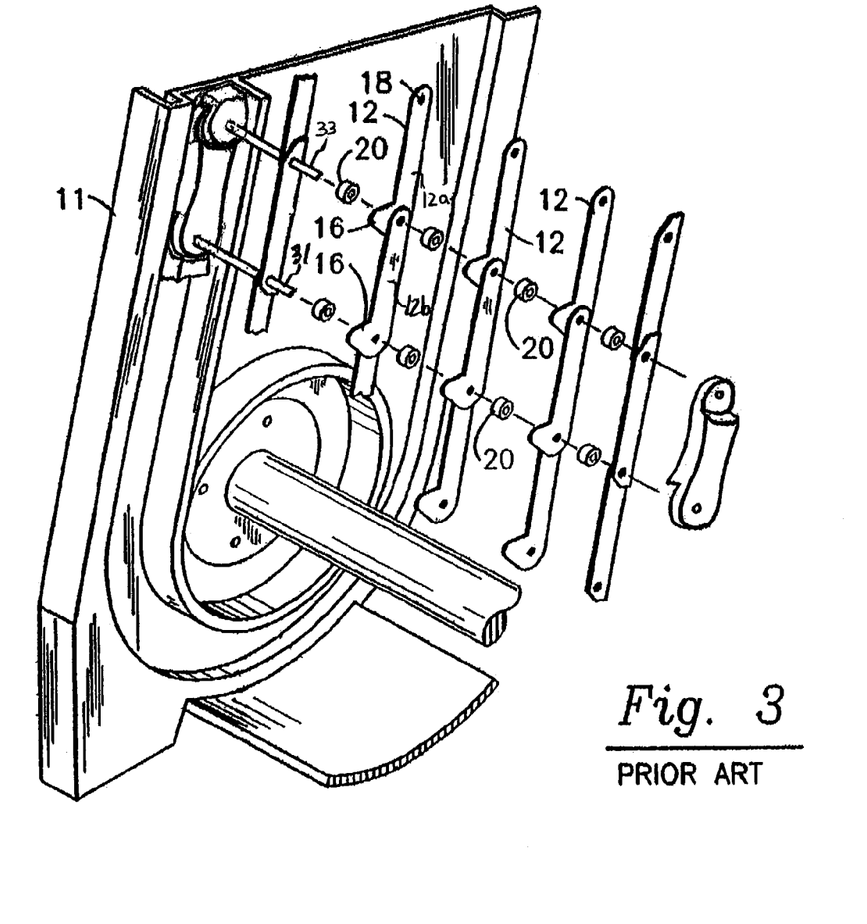
FIG. 3 is an exploded perspective view showing the assembly of the prior art filter assembly.

An illustrative screen filter apparatus 10 is shown in FIGS. 1–3. Referring first to FIG. 1, it will there be seen that a waste material filtering apparatus 10 of the prior art generally includes a frame 11, a plurality of pipe spreaders 13, a drive motor 15 connected to a drive sprocket assembly 22 by a drive belt or chain 23, shown in phantom lines, and a rotating screen assembly 17 driven by the sprocket assembly. Referring to FIG. 2, the apparatus 10 sits in a channel 21 within which flows a stream of water containing solid waste.

The rotating grid assembly 17 includes a plurality of vertically disposed, laterally spaced apart rotating screen segments that collectively form the screen cleaning grid, with the lateral spacing between contiguous rotating screen segments limiting the size of the waste materials that can flow past the machine and into downstream treatment stations where smaller particles are removed from the water. Each rotating screen segment is formed by a plurality of link members 12 that are disposed in articulated relation to one another. The trailing end of each link 12 has an integral horizontally-extending part 16 that helps hold and lift solid matter from the stream as the screen segments travel upwardly on the upstream side of the machine. Means are provided at the discharge end of the apparatus for dumping the matter so lifted into a solid waste collection container.

The opposite end of each link 12 is mounted on a shaft 31, 33. The trailing end of each link 12 is the aforementioned horizontally-extending member 16 that helps hold and lift solid matter from the water stream as the links rotate, as is perhaps best understood by observing the links at the lower left corner of FIG. 1. The uppermost or leading end of each link is denoted 18. Plural directional arrows, collectively denoted 19, show the path of travel followed by the links as the machine operates. The orientation of machine 10 in a channel of water is shown in FIG. 2. The concrete channel is denoted 21. In this particular example, there are about twenty five upstanding screen segments disposed in equidistantly spaced lateral relation to one another, each screen segment being formed by a group of articulated link members 12.

The conventional assembly pattern of links is best understood in connection with FIG. 3. The links 12 of the prior art rotating screen are typically assembled in the following pattern. The trailing and leading ends 16, 18, respectively, of a link 12a are slipped onto a pair of contiguous shafts 31, 33, with the same procedure repeated about the remaining alternating shafts 31, 33 of the screen assembly 17. The trailing end of the next link 12b is then slid onto shaft 31 and the leading end of that link is slid onto shaft 33. The alternating pattern is then followed as links are placed on all of the shafts 31, 33. Spacers 20 are then added to each shaft, and the same pattern of assembly is repeated to construct a screen assembly 17 of a desired width. The alternating nature of the links 12a, 12b connects the links into a continuous loop.

The screen assembly 17 is generally a large structure that is directly driven by the sprocket drive assembly 22 and is under significant tension. Therefore, removal of any of the shafts 31, 33 after installation typically causes complete loop failure. Also, the tensile load also makes field reinstallation of the shaft difficult, if not impossible. Due to the continuous grid or belt design employed in these machines, the head tracking support structure of the grid, the driving sprockets and the wear tracking components in the submerged channel area are all located within the "continuous loop" of the grid and provide no operator access for either inspection or replacement of the wearing components. In order to perform an inspection of wearing components, the screen headsection must have the covers removed and the very heavy grids must be broken apart at various areas, generally one at a time, for inspections at key points, which is a complicated, tedious major maintenance activity. Also, this model of screen is prone to having wastewater screenings forced through the front grid and trapped by the rear return portion of the grid. Without flushing the trapped material out of the screen, the headlosses through the screen becomes excessive. In order to clean the grids out, high pressure hoses are trained on the mass of debris until eventually most is broken up and flushed out. However, with no simple means to flush the units this process becomes prohibitively time consuming to plant maintenance personnel. Accordingly, easy internal access for inspection and maintenance is desired.

SUMMARY

The present invention provides a fine filter screen assembly. The screen assembly comprises a length of filter screen having a relatively fine filtering surface and terminating at opposite ends with opposed end shafts. Generally open connecting means interconnect the opposed end shafts to define a continuous loop structure while maintaining a generally open area between the end shafts. At least one removable filter grid having a substantially fine filtering surface is configured to be removably mounted between the opposed end shafts such that the continuous loop structure has a substantially continuous, relatively fine filtering surface. Removal of the grid allows internal access to the screen assembly.

DETAILED DESCRIPTION OF THE PREFERRED EMBODIMENTS

The present invention will be described with reference to the accompanying drawing figures wherein like numbers represent like elements throughout. Certain terminology, for example, "top", "bottom", "right", "left", "front", "frontward", "forward", "back", "rear" and "rearward", is used in the following description for relative descriptive clarity only and is not intended to be limiting.

Figure 4:
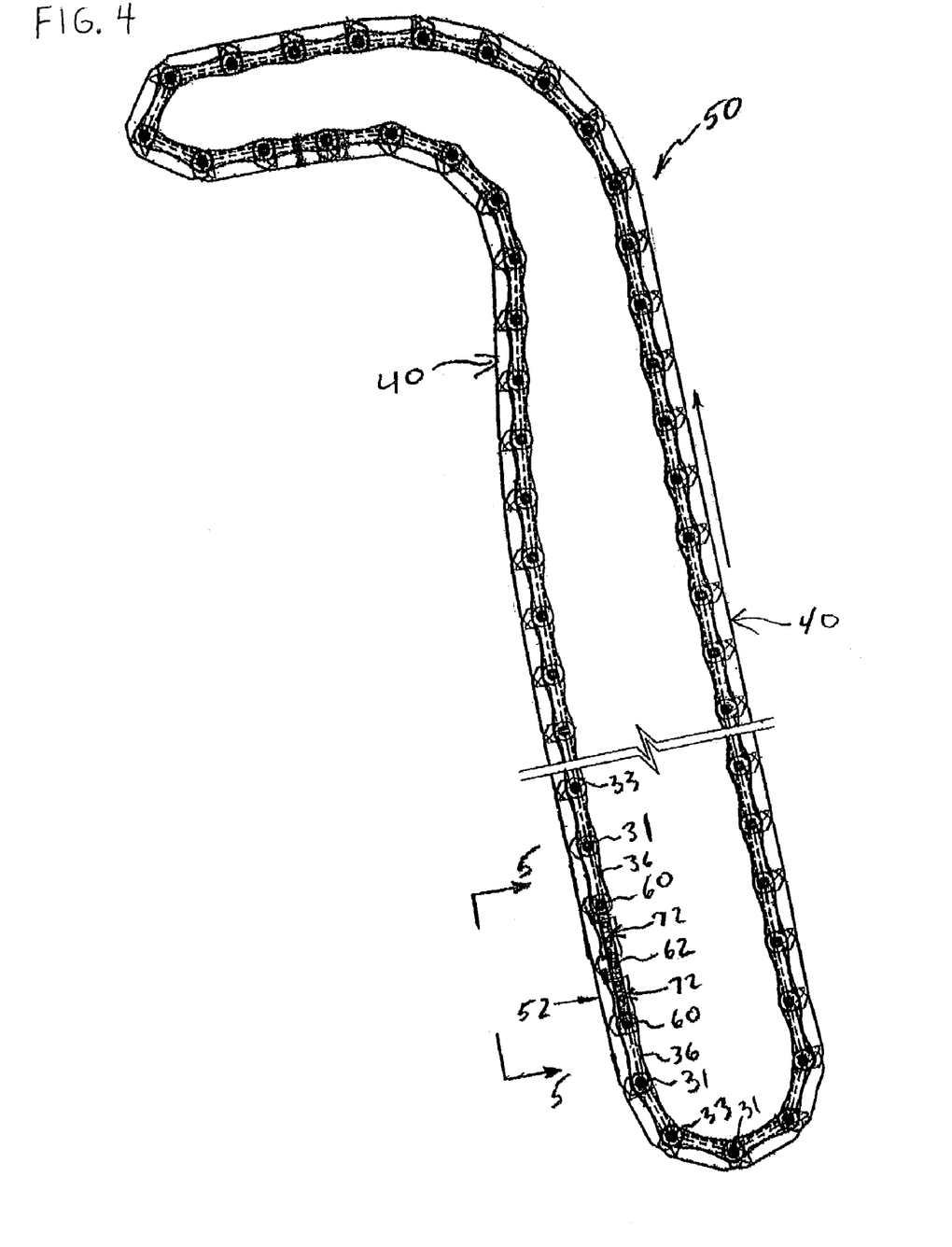
FIG. 4 is a side elevational view of a filter screen assembly of the present invention.
Figure 5:
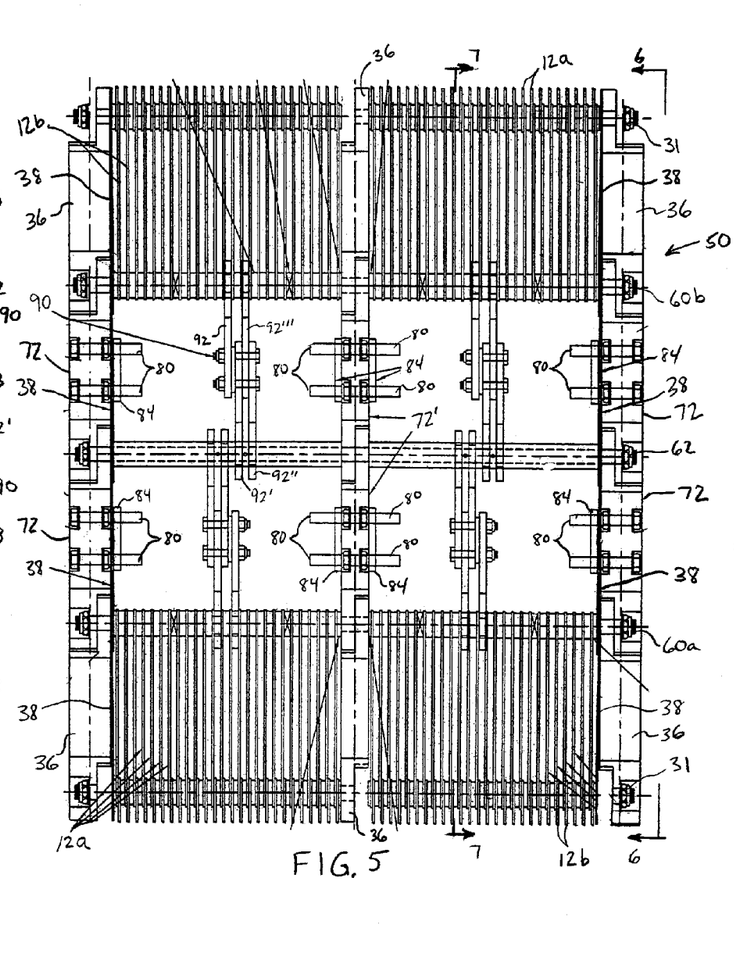
FIG. 5 is a front elevational view of a removable screen portion of the screen assembly of the present invention viewed along the line 5—5 in FIG. 4.
Figures 12, 14:
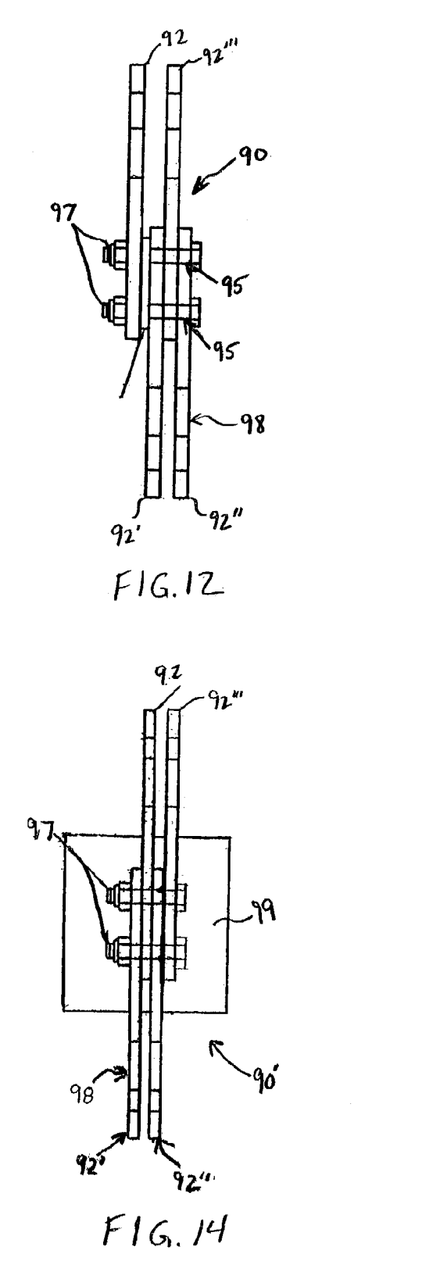
FIGS. 12 and 13 are front and side, respectively, elevational views of an assembled preferred clamping element of the present invention.
FIG. 14 is a front elevational view of a second embodiment of an assembled preferred clamping element of the present invention.
Figure 13:
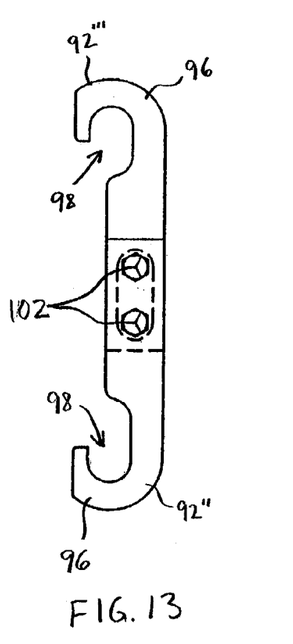
Figure 15:
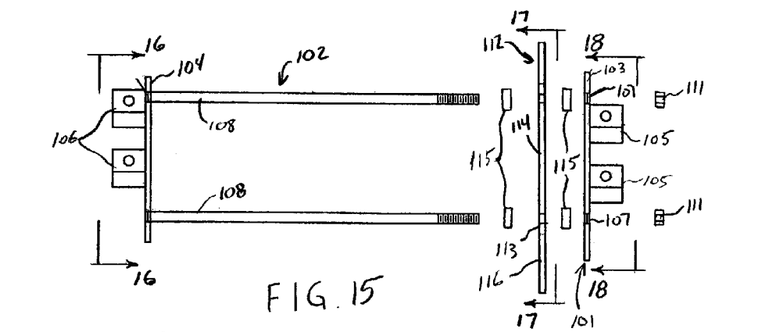
FIG. 15 is a exploded front elevational view of a preferred removable filter grid panel in accordance with the present invention.
Figure 16:
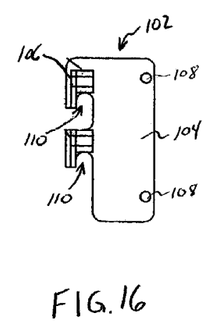
FIG. 16 is a side elevational view of a grid panel left end plate assembly along the line 16—16 in FIG. 15.

Referring to FIGS. 4, 5 and 12, the present invention provides a fine filter screen assembly 50 with at least one removable filter grid 100 that is removed to define an open access area 52. The filter screen assembly 50 comprises a substantial area of standard filter screen 40, i.e. a plurality of links 12 interconnected between parallel shafts 31, 33 with end and center guide plates 36 extending between the shafts 31, 33. Standard end shields 38 are also shown along the outer edges of the standard screen area 40. The standard screen area 40 is generally manufactured in a standard manner, except that the last section of opposed links 12a and 12b are not interconnected with a standard shaft 33. Instead, each end of the standard screen area has an end shaft 60 inserted and secured through its links 12. For example, referring to FIG. 5, links 12a are interconnected to end shaft 60a and links 12b are interconnected to end shaft 60b with the standard screen area 40 terminating at the respective end shafts 60a and 60b. The links 12a and 12b of the last sections are generally standard links, but may have a slightly modified configuration, for example, removal of the hook portions 16, to prevent interference with the removable grids 100. Spacers 39 may be positioned at intervals along each end shaft 60 to minimize lateral wandering of the links 12. The standard screen area 40 functions in a normal manner upon completion of the screen assembly 50.

Referring to FIGS. 5–12, side and center guides 72, 72' and a plurality of clamps 90 are used to interconnect the opposed end shafts 60a and 60b to complete the continuous loop of the screen assembly 50. The opposed end shafts 60a and 60b may be interconnected directly to one another, but it is preferred to include at least one center shaft 62 therebetween to increase the size of the open area 52. In the preferred embodiment illustrated in FIG. 5, a plurality of clamps 90 extend between end shaft 60a and the center shaft 62 and a plurality of clamps 90 extend between the center shaft 62 and end shaft 60b. The clamps 90 are preferably spaced to provide a desired level of accessibility into the screen assembly 50 while still maintaining the screen assembly 50 as a continuous loop such that the screen assembly 50 remains fully functional. As such, the filter drive 22 can be used to move the open area 52 progressively around the loop to check different internal areas of the filter assembly 10. It is further contemplated that in the event greater access is desired, for example, to perform a repair, some of the clamps 90 may be temporarily removed to allow greater access and then reinstalled once access is no longer needed. The end shafts 60 and the center shaft 62 are preferably heavy duty steel shafts to support the tensile load applied by the clamps 90 and the guides 72.

Figure 6:
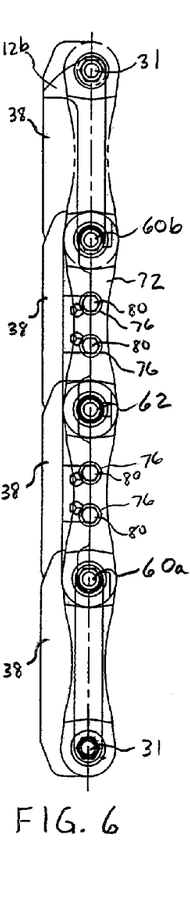
FIG. 6 is a side elevational view along the line 6—6 in FIG. 5.
Figure 7:
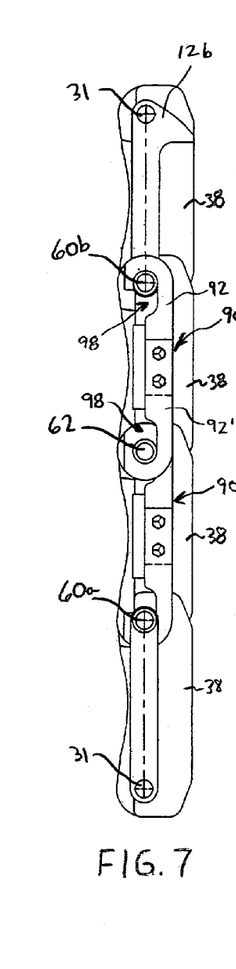
FIG. 7 is an elevational view along the line 7—7 in FIG. 5.
Figure 8:
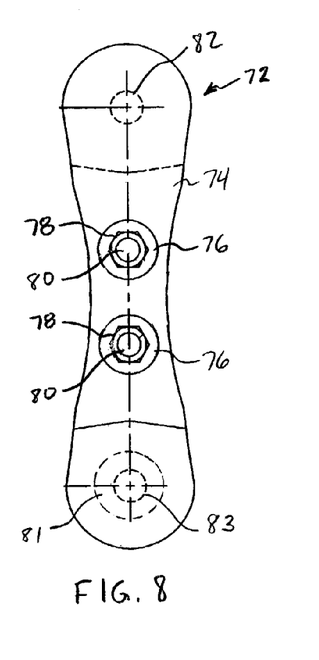
FIG. 8 is a side elevational view of a preferred guide member utilized in the present invention.
Figure 9:
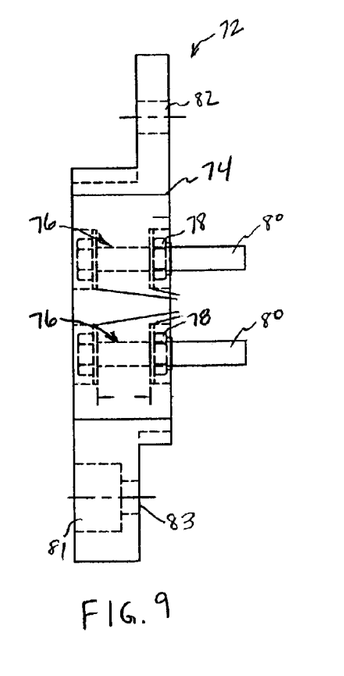
FIGS. 9 and 10 are front elevational views of side and center guide members of the present invention.
Figure 10:
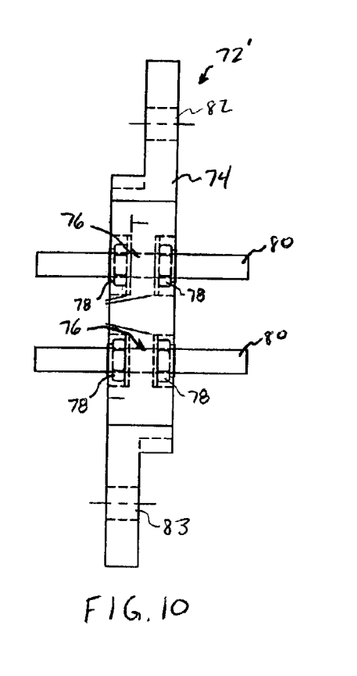
Figure 11:
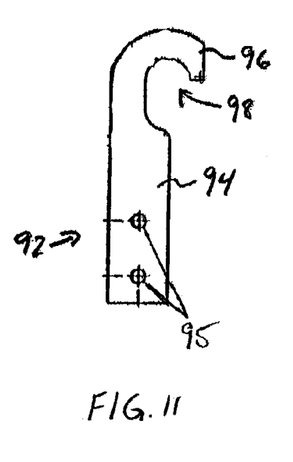
FIG. 11 is a side elevational view of a portion of the preferred clamping element of the present invention.

Referring to FIGS. 8–10, preferred embodiments of the side and center guides 72, 72' of the present invention are shown. Each guide member 72, 72' includes a guide body 74 that is substantially the same as a standard guide 36. The guide body 74 includes bores 82 and 83 at each end for receiving the shafts 60 and 62. The side guides 72 also includes an enlarged bore portion 81 aligned with one of the bores 83 to receive a shaft securing nut (not shown). To facilitate support of the removable grid panels 100, each guide 72, 72' has a plurality of posts 80 extending therefrom. In the preferred embodiment, post bores 76 are provided through the guide body 74 such that posts 80 can be positioned therethrough and secured with nuts 78 or the like. Other configurations, for example, a body with integral posts extending therefrom, may also be utilized. The side guides 72 include posts 80 extending inward. The center guides 72' include posts 80 extending in both directions. As shown in FIGS. 5–7, the guides 72 can be utilized with standard end shields 38. Additionally, spacers 84 may be provided about the posts 80 to provide a desired positioning of the installed grid panels 100.

Referring to FIGS. 11–14, a preferred embodiment of the clamps 90 of the present invention is shown. Each clamp 90 preferably includes at least two opposed hook members 92. Each hook member 92 includes a body portion 94 terminating in a hook 96 that defines a shaft receiving cavity 98. The hook body 94 includes bolt receiving bores 95. The hook members 92 are preferably manufactured from stainless steel. Other materials, preferably tensile load supportive materials, may also be utilized. In the preferred embodiment, first and second hook members 92 and 92''' are alternated with a pair of opposed hook members 92' and 92'' with the receiving bores 95 aligned. As illustrated in FIG. 12, one or more shims 93 may be aligned with the hook members 92 to provide a desired spacing. The hook members 92, 92', 92'' and 92''', and spacer shim, if included, are interconnected by bolts 97 secured through the bores 95. Other securing means, for example, welding, cotter pins or the like, may also be utilized. While four hook members 92 are preferred, more or fewer hook members 92 may be included. Additionally, the clamp 90 may include an internal wear plate 99, see FIG. 14, affixed to the hook members 92 to absorb contact with the filter assembly drive and track systems.

Referring to FIGS. 15–20, the preferred removable filter grid 100 will be described. The preferred filter grid 100 includes a first end plate assembly 102. The first end plate assembly 102 includes a plate 104 with a pair of link support rods 108 extending therefrom. A pair of cover retainer blocks 106 extend from the opposite side of the plate 104. The plate 104 and the retainer blocks 106 are configured to define a pair of post receiving slots 110, see FIG. 16.

Figure 17:
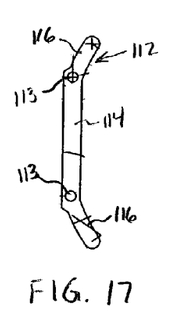
FIG. 17 is a side elevational view of a grid panel link along the line 17—17 in FIG. 15.
Figure 18:
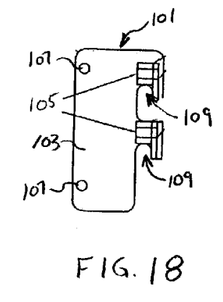
FIG. 18 is a side elevational view of a grid panel right end plate assembly along the line 18—18 in FIG. 15.
Figure 19:
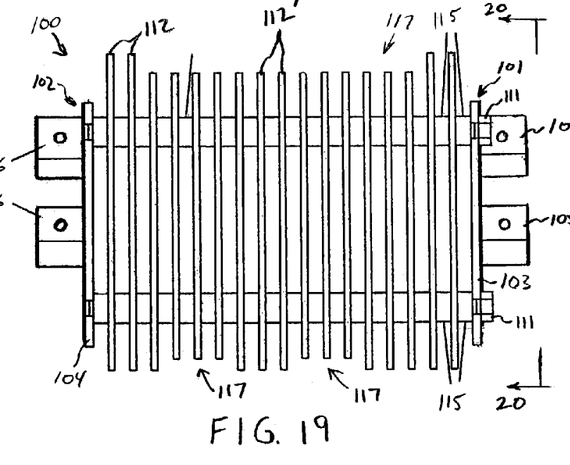
FIG. 19 is a front elevational view of a preferred assembled removable filter grid panel in accordance with the present invention.
Figure 20:
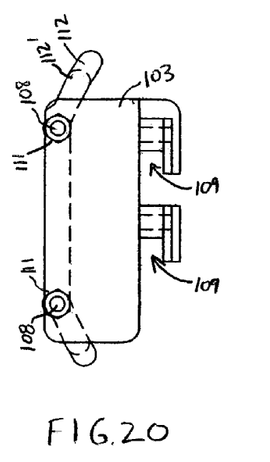
FIG. 20 is a side elevational view of a grid panel along the line 20—20 in FIG. 19.

The rods 108 support a desired number and configuration of links 112 and spacers 115. The links 112 includes through holes 113 to receive the rods 108. Referring to FIG. 17, the preferred links 112 have a linear body 114 with inward curved ends 116 to facilitate travel of the links 112 around the filter assembly 10. Other configurations are also possible. Additionally, as shown in FIGS. 19 and 20, the links 112, 112' preferably have different lengths to define recesses 117 along the removable grid panel 100. The recesses 117 are preferably included to further facilitate travel of the removable grid 100. For example, the recesses 117 may permit proper clearance for the clamps 90 when the filter screen assembly 50 is rolled backward, which is done on occasion for maintenance or the like.

Once the desired configuration of links 112 and spacers 115 is positioned on the rods 108, a second end plate assembly 101 is secured on the rods 108 with nuts 111 or the like. The second end plate assembly 101 is similar to the first end plate assembly 102 and includes a plate 103 with a pair of cover retainer blocks 105 extending therefrom. The plate 103 and the retainer blocks 105 are configured to define a pair of post receiving slots 109, see FIG. 18. The plate 103 also includes a pair of through holes 107 to receive the rods 108. Once the second end plate 103 is secured, the filter grid panel 100 is a structurally stable, independent grid with a fine filtering surface.

In the preferred method of assembly, the bores 82, 83 of the guides 72, 72' are preferably aligned with the respective links 12 and standard guides 36 such that the end shafts 60 can be passed therethrough. In the preferred embodiment illustrated in FIG. 5, the opposed guides 72, 72' have their bores 82, 83 aligned and the center shaft 62 is passed therethrough to complete the loop. After the shafts 60, 62 are positioned, the clamps 90 are positioned and secured. Alternatively, the clamp shaft receiving cavities 98 can be aligned with the bores 82, 83 during assembly such that the shafts 60, 62 are received in the clamp shaft receiving cavities 98 at the same time that the shafts 60, 62 are inserted into the guides 72, 72'. The guides 72, 72' are secured with the posts 80 ready to receive and support the removable grid panels 100. With the shafts 60, 62, guides 72, 72', and clamps 90 assembled, the screen assembly 50 defines a continuous loop that can be operated about the filter assembly 10. The open area 52 allows inspection and access to the entire filter assembly 10.

Figure 21:
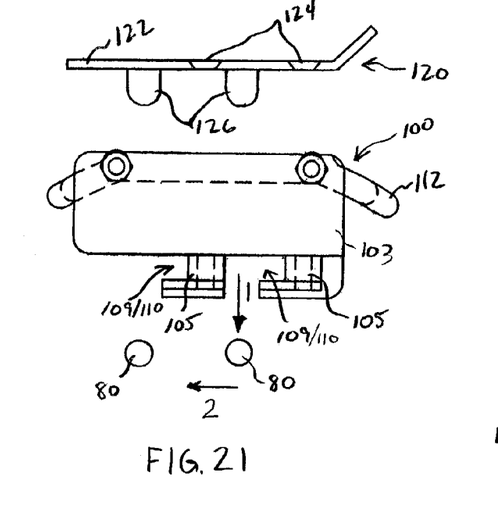
FIGS. 21–23 are side elevational views illustrating the progressive installation of a grid panel.
Figure 22:
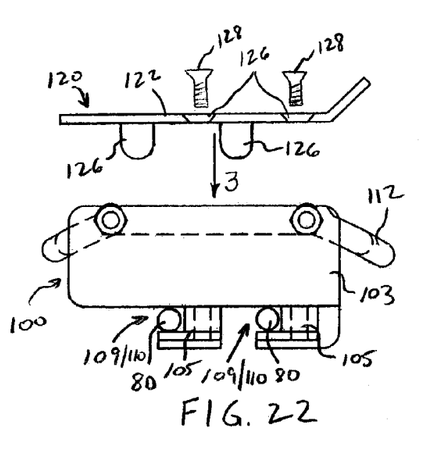
Figure 23:
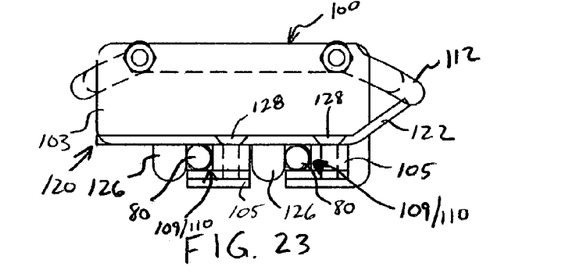

To utilize the filter screen 50 in operation, one or more removable grids 100 are removably secured onto the screen assembly 50. Positioning and securing of the removable grids will be described with reference to FIGS. 21–23. The removable grid 100 is positioned over the open area 52 with the post receiving slots 109, 110 aligned with the respective posts 80 of the guides 72, 72'. As indicated in FIG. 21, the grid panel 100 is moved downward, arrow 1, and then sideways, arrow 2, to position the posts 80 in the slots 109, 110, as illustrated in FIG. 22. With the grid panel 100 supported on the posts 80, a cover 120 is positioned at each end of the grid panel 100. Each cover 120 preferably includes a body panel 122 with fastening bores 124 therethrough and a pair of spaced apart tabs 126 extending from the undersurface. As shown in FIG. 22, a cover 120 is positioned on the respective cover plate retainer blocks 105, 106 at each end of the grid panel 100 and secured thereto with screws 128 or the like. The tabs 126 are positioned such that the tabs 126 confine the posts 80 in the respective slots 109, 110, as shown in FIG. 23. The grid panel 100 is secured to the filter screen assembly 50 to define a continuous loop of fine filtering screen. However, the grid panels 100 can be easily removed to expose the open area 52 by removing the covers 120.

Figure 24:
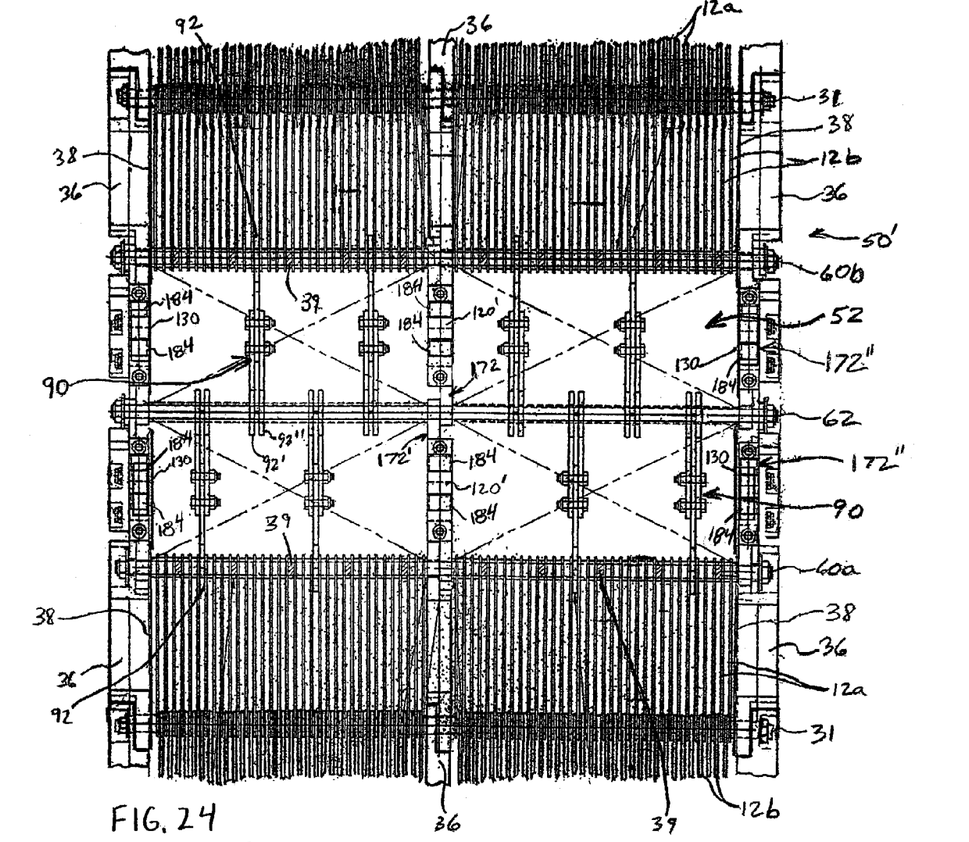
FIG. 24 is a front elevational view of a removable screen portion of the screen assembly, similar to FIG. 5, of an alternate embodiment of the present invention.

As explained above, the preferred assembly 50 includes guides 72, 72' provided with support posts 80 and grid panels 100 with slots 109, 110 configured to receive and be supported by the posts 80. An alternate embodiment 50', wherein the guides 172 are provided with slots 184 and grid panels 200 with mounting projections 204, 206 is shown with reference to FIGS. 24–29. Referring to FIG. 24, the screen assembly 50' is substantially the same as in the previous embodiment and provides a continuous, operable loop with an open area 52. The primary distinction is that the guides 172 include projection receiving slots 184.

Figure 25:
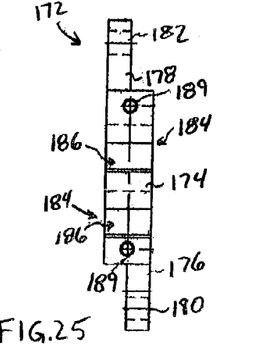
FIGS. 25 and 26 are front and side, respectively, elevational views of an alternative guide member utilized in the present invention.
Figure 26:
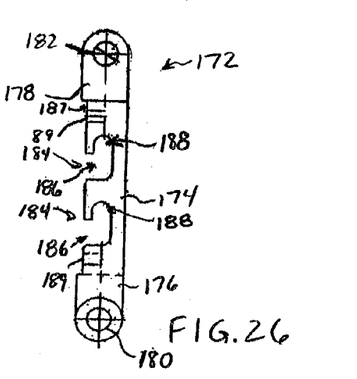

Referring to FIGS. 25 and 26, a guide 172 of the present embodiment is shown. The guides 172 are used as center guides 172' and end guides 172''. Each guide 172 generally has a central body portion 74 with opposed end extensions 76 and 78. The end extensions 76 and 78 allow the guides 172 to overlap with the standard guides 36 which have extensions thereon. The end and center guides 172 are substantially the same, but may have slightly different configurations, for example, different sizing and relative positioning of the extensions 176, 178, to facilitate their specific positioning in the screen assembly 50'. Each extension 176, 178 has a respective shaft receiving bore 180, 182 therethrough. Additionally, the guide body 174 preferably includes a pair fastener bores 189 and a pair of projection receiving slots 184. Each slot 184 includes an opening 186 leading to a retention area 188. The function of the bores 189 and slots 184 will be described hereinafter. The guides 172 are preferably manufactured from stainless steel.

Figure 27:
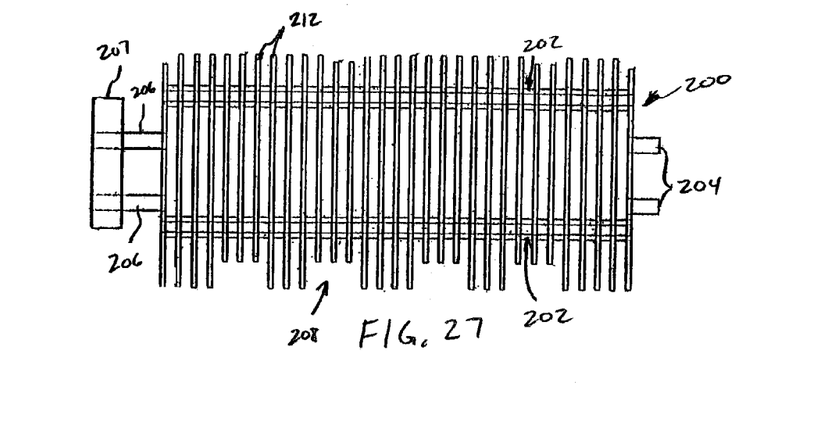
FIG. 27 is a front elevational view of an alternate removable filter grid panel in accordance with the present invention.

Referring to FIG. 27, a removable filter grid 200 of the present embodiment is shown. The grid 200 includes a pair of opposed frame members 202 supporting a plurality of links 212 at a desired spacing. The links 212 have a structure similar to the standard links 12, but are preferably rigidly attached to the frame members 202 since they do not have to pivot thereabout. Additionally, the links 212 may have differing lengths, for example, to define recesses 208. Mounting projections 204 and 206 extend from the link members 212 at each end of the grid 200 and are configured to be received in the guide link slots 184. The outside projections 206 preferably have a spacer block 207 formed thereon to maintain proper alignment along the edge of the screen assembly 50'.

With the shafts 60, 62, guides 172, and clamps 90 assembled, the removable grids 200 are removably positioned onto the screen assembly 50' by positioning the mounting projections 204, 206 through respective guide slot openings 186 and into the respective retention areas 188. After the mounting projections are received in the retention areas 188, a cover 120', 130 is removably secured to the guide 172 via fasteners, for example, screws, bolts or the like, that may be received in the fastener bores 189. Other fastening means may also be utilized. The guides 172 may include a recess area 187 for receiving the cover 120', 130.

Figure 28:
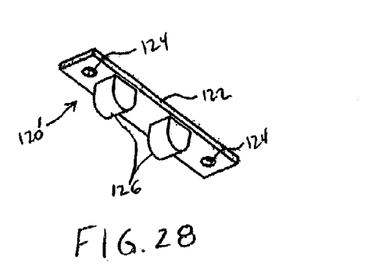
FIG. 28 is an isometric view an alternate center cover in accordance with the present invention.
Figure 29:
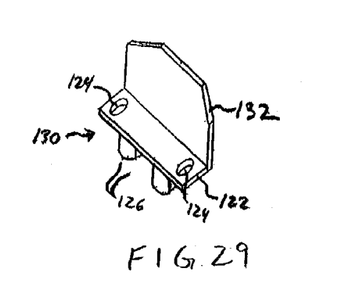
FIG. 29 is an isometric view an alternate end cover in accordance with the present invention.

Preferred center and end covers 120', 130 are shown in FIGS. 28 and 29, respectively. The center cover 120' preferably includes a flat plate 122 configured to cover the slot openings 186. Fastener holes 124 extend through the plate 122 and align with the guide fastener bores 189. A pair of tabs 126 extend from the undersurface of the plate 122. Each tab 126 is configured to fill the opening area 186 of the slot 184 such that the mount projections 204, 206 are confined in the retention areas 188. The end cover 130 is substantially the same as the center cover 120 with the exception that it also includes a shield plate 132 extending substantially perpendicular to the flat plate 122.

Figure 30:
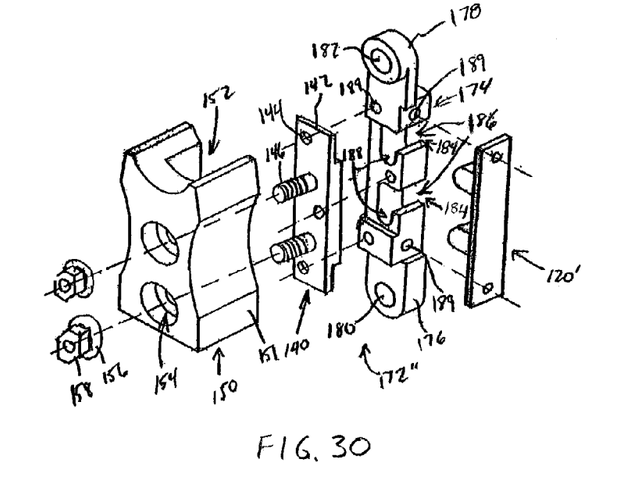
FIG. 30 is an exploded isometric view of an alternative end guide assembly.
Figure 31:
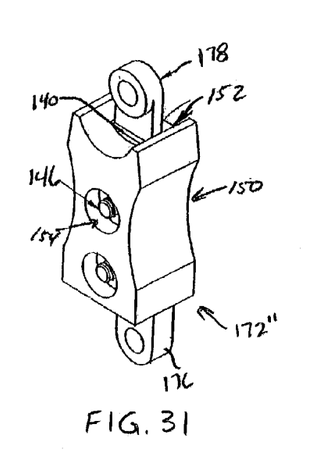
FIG. 31 is an isometric view of the end guide assembly of FIG. 30 after assembly.

Referring to FIGS. 30 and 31, an alternative embodiment of the end guide 172" is shown. The assembly includes a guide substantially the same as guide 172. The guides 172" have a body 174 with opposed end extensions 176 and 178. Each extension 176, 178 has a respective shaft receiving bore 180, 182 therethrough. The guide body 174 preferably includes a plurality of fastener bores 189 and a pair of projection receiving slots 184. Each slot 184 includes an opening 186 leading to a retention area 188. A cover 120' is securable to the guide body 174 in a manner to the guide 172. A support block mount 140 has a plate 142 with a plurality of bores 144 for securing the mount 140 to the guide body 174. One face of the mount 140 includes a pair of threaded pegs 146 extending therefrom configured to secure a support block 150. The support block 150 has a body 151 with a guide receiving slot 152 and a pair of peg receiving bores 154. The block 150 is positioned about the guide body 174 and secured with washers 156 and nuts 158, or the like. The interconnected support block 150 replaces the spacer block 207 such that the grid mounting projections 206 can be formed the same length as the projections 204.

What is claimed is:

1. A fine filter screen assembly comprising:
   a length of filter screen extending in a longitudinal direction and having a relatively fine filtering surface and terminating at opposite ends with opposed end shafts, the length of filter screen being formed by a plurality of screen segments each screen segment formed by a plurality of parallel articulated link members, the link members being supported at their opposite ends on transverse shafts, the link members being spaced apart so as to form a filter;
   generally open connecting means for connecting the opposed end shafts to define a continuous loop structure while maintaining a generally open area between the opposed end shafts;
   at least one removable filter grid supported in the open area between the opposed end shafts and having a substantially fine filtering surface and configured to be removably mounted between the opposed end shafts such that the continuous loop has a substantially continuous, relatively fine filtering surface.

2. The fine filter screen assembly of claim 1 wherein the connecting means includes a clamping assembly.

3. A fine filter screen assembly comprising:
   a length of filter screen having a relatively fine filtering surface and terminating at opposite ends with opposed end shafts;
   generally open connecting means for connecting the opposed end shafts to define a continuous loop structure while maintaining a generally open area between the end shafts, the connecting means including a clamping assembly;
   at least one removable filter grid having a substantially fine filtering surface and configured to be removably mounted between the opposed end shafts such that the continuous loop has a substantially continuous, relatively fine filter surface; and
   wherein the clamping assembly includes at least one clamp member having hooks at opposed end, each hook having a shaft receiving cavity for receiving a respective shaft.

4. The fine filter screen assembly of claim 3 wherein the opposed hooks are separable to remove the clamping assembly.

5. The fine filter screen assembly of claim 2 wherein the clamping assembly includes at least one internal wear plate.

6. The fine filter screen assembly of claim 1 wherein the connecting means includes at least two spaced apart guides extending between the end shafts and the guides include means for supporting the removable filter grid.

7. The fine filter screen assembly of claim 6 wherein each guide includes at least one post extending therefrom and the removable filter grid has opposed ends, with each end having one or more slots configured to receive the respective posts.

8. A fine filter screen assembly comprising:
   a length of filter screen having a relatively fine filtering surface and terminating at opposite ends with opposed end shafts,
   generally open connecting means for connecting the opposed end shafts to define a continuous loop structure while maintaining a generally open area between the end shafts;

at least one removable filter grid having a substantially fine filtering surface and configured to be removably mounted between the opposed end shafts such that the continuous loop has a substantially continuous, relatively fine filtering surface;

the connecting means including at least two spaced apart guides extending between the end shafts and the guides include means for supporting the removable filter grid, each guide including at least one post extending therefrom;

the removable filter grid including opposed ends, with each end having one or more slots configured to receive the respective posts, and wherein each filter end is configured to receive a removable cover plate, each cover plate having at least one tab configured to extend adjacent to a respective slot and thereby confine the respective post within the slot.

9. The fine filter screen assembly of claim 6 wherein the removable filter grid has opposed ends, with each end having one or more posts extending therefrom and each guide has one or more slots configured to receive and support the posts at a respective end of the removable filter grid.

10. A fine filter screen assembly comprising:

a length of filter screen having a relatively fine filtering surface and terminating at opposite ends with opposed end shafts, generally open connecting means for connecting the opposed end shafts to define a continuous loop structure while maintaining a generally open area between the end shafts;

at least one removable filter grid having a substantially fine filtering surface and configured to be removably mounted between the opposed end shafts such that the continuous loop has a substantially continuous, relatively fine filtering surface;

the connecting means including at least two spaced apart guides extending between the end shafts and for supporting the removable filter grid, wherein the removable filter grid has opposed ends, with each end having one or more posts extending therefrom and each guide has one or more slots configured to receive and support the costs at a respective end of the removable filter grid, and wherein each guide is configured to receive a removable cover plate, each cover plate having at least one tab configured to extend adjacent to a respective slot and thereby confine the respective post within the slot.

11. The fine filter screen assembly of claim 1 wherein the removable filter grid comprises a pair of spaced apart rods extending between opposed end members with a plurality of spaced apart links supported on the rods.

12. The fine filter screen assembly of claim 11 wherein the links have a substantially linear surface between the rods and inwardly curved ends.

13. The fine filter screen assembly of claim 11 wherein the plurality of links consists of subsets of links having different lengths.

14. The fine filter screen assembly of claim 11 wherein each end member includes at least one post receiving slot.

15. The fine filter screen assembly of claim 11 wherein each end member includes at least one post extending outward therefrom.

16. The fine filter screen assembly of claim 1 including at least two removable filter grids removably mounted between the opposed end shafts.

\* \* \* \* \*

UNITED STATES PATENT AND TRADEMARK OFFICE
CERTIFICATE OF CORRECTION

PATENT NO.       : 6,994,785 B2                                         Page 1 of 1
APPLICATION NO. : 10/364871
DATED            : February 7, 2006
INVENTOR(S)      : Stephen B. Wilcher It is certified that error appears in the above-identified patent and that said Letters Patent is hereby corrected as shown below:

On The Title Page:

Item (73) Assignee: United States Filter Corporation
                    Palm Desert, CA (US)

(73) Assignee: USFilter Corporation
               Warrendale, PA (US)

Signed and Sealed this

Twenty-seventh Day of February, 2007

JON W. DUDAS
*Director of the United States Patent and Trademark Office*